United States Patent
Sheleheda et al.

(10) Patent No.: US 7,930,746 B1
(45) Date of Patent: *Apr. 19, 2011

(54) METHOD AND APPARATUS FOR DETECTING ANOMALOUS NETWORK ACTIVITIES

(75) Inventors: Daniel Sheleheda, Florham Park, NJ (US); Michael Singer, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1440 days.

This patent is subject to a terminal disclaimer.

(21) Appl. No.: 11/321,423

(22) Filed: Dec. 29, 2005

(51) Int. Cl.
*G08B 23/00* (2006.01)

(52) U.S. Cl. ............... 726/23; 726/22; 726/25; 726/14; 713/151; 713/153

(58) Field of Classification Search .............. 726/22, 726/23, 24, 25, 26, 27, 28, 29, 30
See application file for complete search history.

(56) References Cited

U.S. PATENT DOCUMENTS

| | | | |
|---|---|---|---|
| 6,356,282 B2 | 3/2002 | Roytman et al. | |
| 6,513,129 B1 | 1/2003 | Tentij et al. | |
| 6,748,432 B1 | 6/2004 | Du et al. | |
| 6,963,983 B2* | 11/2005 | Munson et al. | 726/5 |
| 7,370,357 B2* | 5/2008 | Sekar | 726/23 |
| 7,408,458 B1 | 8/2008 | Sheleheda et al. | |
| 7,631,058 B2* | 12/2009 | Grabarnik et al. | 709/223 |
| 2004/0117658 A1* | 6/2004 | Klaes | 713/201 |
| 2005/0060562 A1* | 3/2005 | Bhattacharya et al. | 713/200 |
| 2006/0123479 A1* | 6/2006 | Kumar et al. | 726/23 |
| 2007/0143851 A1* | 6/2007 | Nicodemus et al. | 726/25 |

* cited by examiner

*Primary Examiner* — Pramila Parthasarathy

(57) ABSTRACT

A method and apparatus for detecting an anomalous activity in a communications network is described. In one example, short-term event data is received from a plurality of servers. An event detection rule is then executed to process the short-term event data over a predefined time period. Afterwards, at least one alarm message is generated in response to detecting the anomalous activity in accordance with at least one predefined long-term security data mining program. In response, the at least one alarm message is provided to at least one of the plurality of servers.

18 Claims, 3 Drawing Sheets

METHOD AND APPARATUS FOR DETECTING ANOMALOUS NETWORK ACTIVITIES

BACKGROUND OF THE INVENTION

1. Field of the Invention

Embodiments of the present invention generally relate to anomaly detection systems and, more particularly, to a method and apparatus for detecting anomalous activities in a communications network, such as an enterprise environment.

2. Description of the Related Art

Background

Presently, there is a constant need for enterprise environments to identify suspicious and potentially harmful network activity. Consequently, security event detection rules need to be continuously running in order to detect events that occur in the short-term. However, commonly used state models that support security event detection rules are limited by the span of time, the number of data keys and amount of supporting information that can be maintained in states. Although suppliers of commercially available systems continue to try to increase the amount of memory available to the state based modeling environment, this course of action still does not satisfy the requirements needed to employ a large-scale, data inspection process. Similarly, attempts have been made to limit the number of objects in state and/or the number of attributes per object. These attempts not only reduce overall system usefulness, but also only provide temporary relief that is subsequently consumed in the event of an increase in scale.

Thus, there is a need in the art for a method and apparatus for detecting suspicious long-term (e.g., low and slow) network activities.

SUMMARY OF THE INVENTION

In one embodiment, a method and apparatus for detecting an anomalous activity in a communications network is described. Specifically, short-term event data is received from a plurality of servers. A state based event detection rule is then executed to process the short-term event data over a predefined time period. Afterwards, at least one alarm message is generated in response to detecting the anomalous activity in accordance with at least one predefined long-term data mining algorithm. In response, the at least one alarm message is provided to at least one of the plurality of servers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
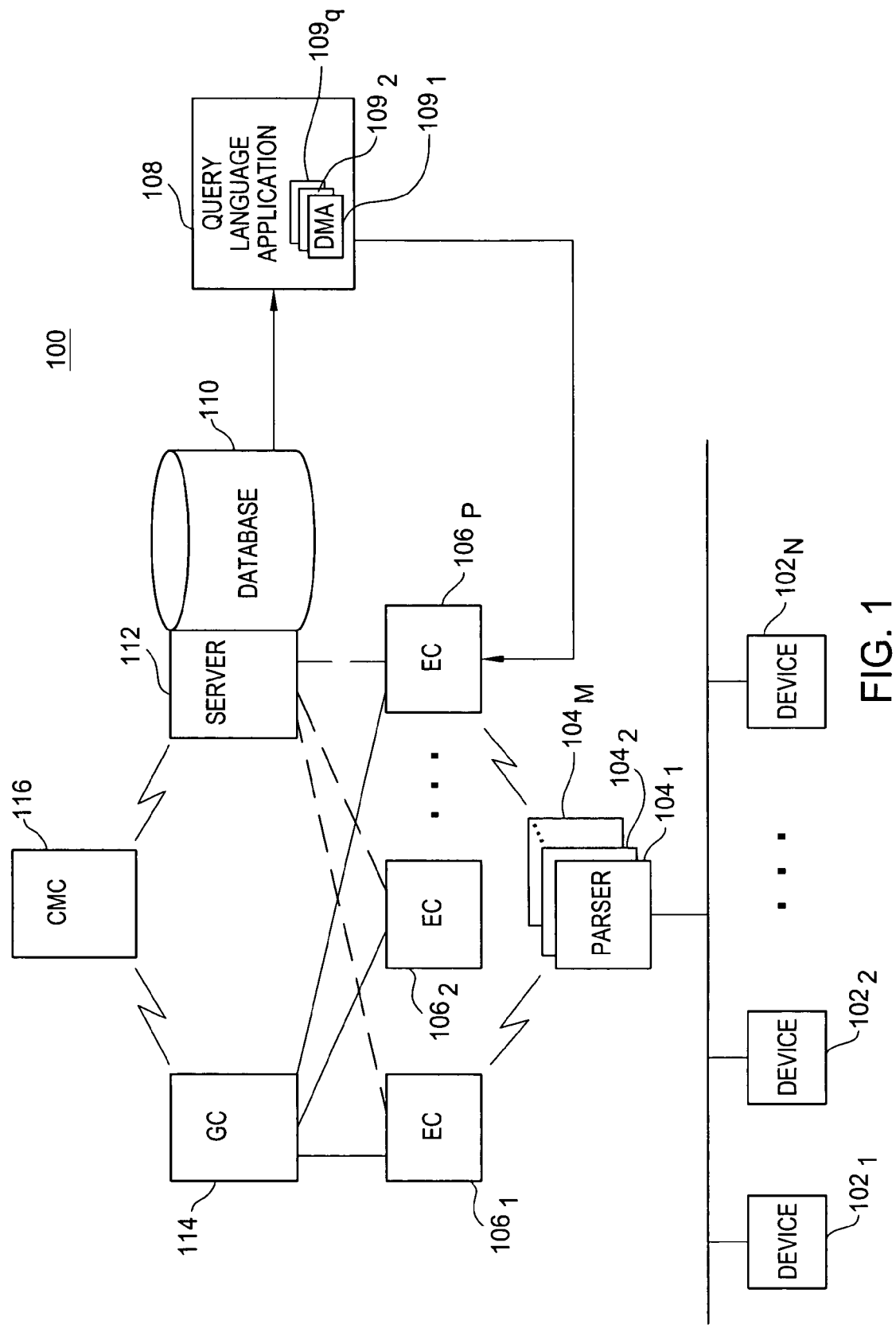
FIG. 1 is a block diagram depicting an exemplary embodiment of a communication system in accordance with the invention.

To better understand the present invention, FIG. 1 illustrates communication architecture comprising an example communications network system 100, such as a security information management (SIM) enterprise environment, related to the present invention. Broadly defined, a SIM enterprise environment includes a network that is configured to automatically collect event log data from a plurality of security and network devices, such as firewalls, proxies, intrusion detection systems (IDSs), routers, and the like. The event log data is processed using data aggregation, standardization, and event correlation mechanisms in a manner that normalizes the information collected from the different security and network devices. The event data is subsequently further processed and ultimately provided to a central management console to be utilized by the network operator. The present invention should not be interpreted as being limited by the architecture depicted in FIG. 1.

In one embodiment, the SIM environment 100 comprises a customer network layer that comprises a plurality of devices $102_{1 \ldots n}$ that are configured for collecting log information. In one embodiment, the log information is made up of log files that record the transactions (e.g., requests, scans, inquiries, and other access actions made by other computers) involving the collection devices $102_{1 \ldots n}$. Specifically, these devices $102_{1 \ldots n}$ may comprise network devices or security devices such as honeypots, tarpits, routers, proxies, IDSs, firewalls, e-mail servers, and the like. The log information produced by the devices $102_{1 \ldots n}$ is ultimately acquired by a collection of parsers $104_{1 \ldots m}$. The parsers 104, which may be located in at least one network server, are responsible for standardizing the log information collected from the network and security devices $102_{1 \ldots n}$. Specifically, the log information generated by the different devices may vary in form. The parsers 104 are able to process the different types of log information and convert all of the data into a homogenous and standard form.

The first "correlation" layer of the SIM system 100 comprises of a plurality of event consolidators (ECs) $106_{1 \ldots p}$. The ECs 106 receive the standardized log information from the parsers 104 and initially perform normalization procedures. The normalization procedures may include timing normalization, classification normalization (i.e., assigning common names to common types of log information), and the like. Afterwards, the ECs conduct brief, near real-time alarming measures. The ECs $106_{1 \ldots p}$ are initially provisioned with a set of security event detection rules that use state tables to "remember" instances of activities that can be used to detect suspicious or anomalous activity over a short period of time (e.g., 5 to 20 minutes), such as a computer that accesses 100 IP ports on 100 different computers in a span of 5 minutes. An EC is limited to the number of objects (e.g., 15,000 objects) that can be held in a state table. Upon detecting an abnormal activity using the security event detection rules, an EC 106 will generate an alarm message that is provided to a global correlator 114. The ECs 106 are also responsible for providing the normalized and standardized information (i.e., event data) to a database 110. In one embodiment, each of the ECs is designated to service a particular geographical region.

The global correlator (GC) 114 is a network element that is responsible for receiving the alarms from the "regional" ECs $106_{1 \ldots p}$. Notably, the GC 114 is still limited to a predefined number of objects (e.g., 15,000 objects) in a state table as well as conducting near real-time alarming over a short period of time (e.g., inspecting log information for suspicious activity in 30 second intervals). The GC 114 is also configured to consolidate and correlate all of the received alarms and provide them to a central management console 116. The GC 114 may also perform an alarm de-duplication process to reduce the number of redundant alarms to the CMC 116.

The database 110 is configured to receive and store normalized and standardized log information (i.e., event raw data) from the ECs 106. In one embodiment, the database 110 comprises a relational database management system (RDMS) that is supported by an application server 112 (e.g., server 112). The database 110 is capable of storing a predefined volume of data (e.g., 100+ million records per day) for an extended period of time (e.g., 120 days, 1 year, etc.).

The query language application 108 (e.g., Cymbal) may also be utilized in the network system 100. Notably, the query language application 108, which may be supported by an application server, receives event data from the database 110 and searches for anomalous network activity using security event detection rules configured to search over a long time period (e.g., 20+ minutes to 120 days worth of data). Notably, the query language application 108 is a high level language that is capable of converting queries (i.e., the security event detection rules) into a lower level language. In one embodiment, the query language application 108 is used to execute a plurality of data mining alarm (DMA) algorithms $109_{1 \ldots q}$ over the event raw data, e.g., for 120 days, or any other predefined time period. In the event suspicious activity is found (e.g., attributes in the event data match the long-term security event detection algorithms), an alarm is generated and provided to at least one EC 106.

Figure 2:
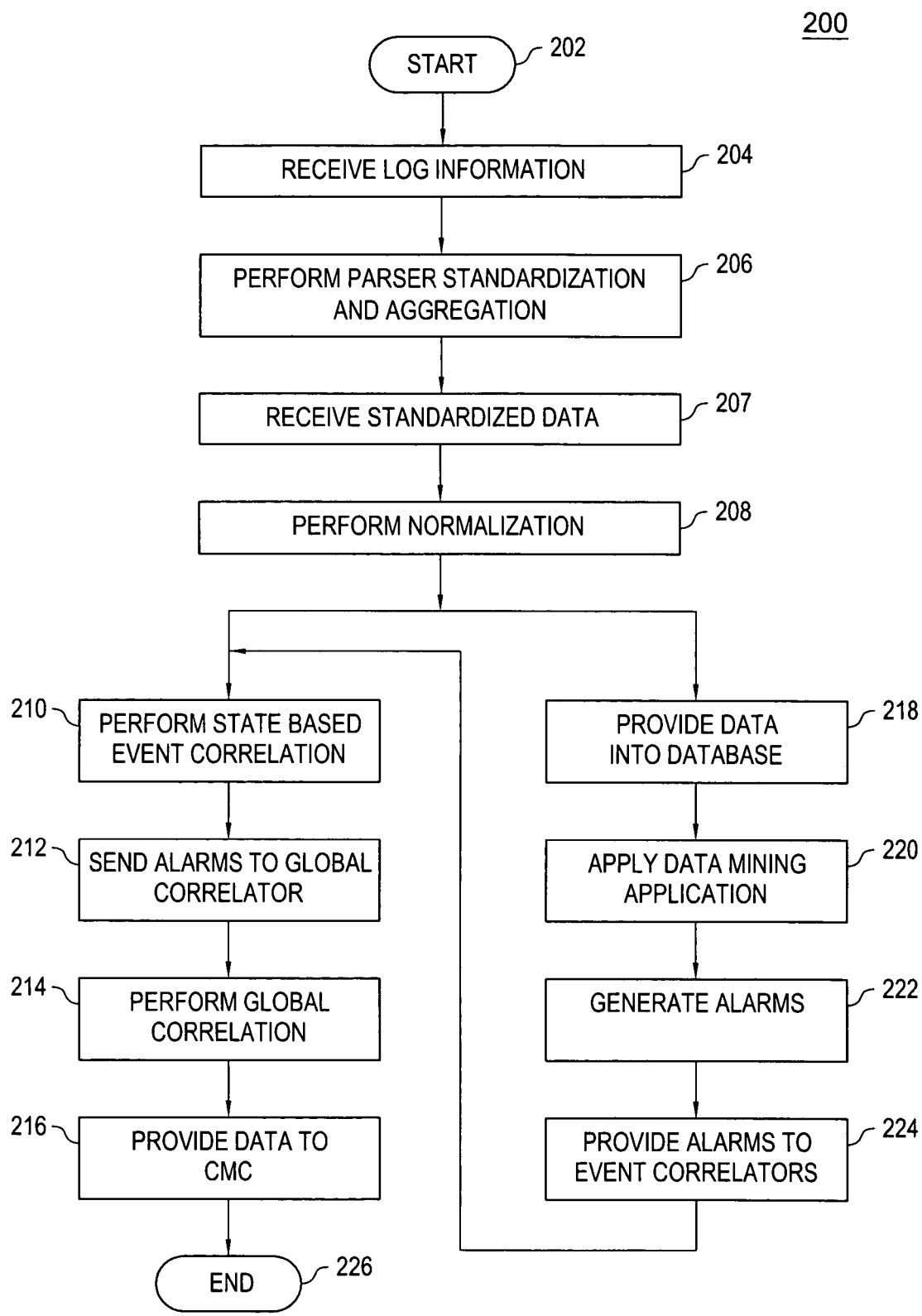
FIG. 2 is a flow diagram depicting an exemplary embodiment of a method for detecting suspicious long-term network activity in a communications network in accordance with one or more aspects of the invention.

FIG. 2 is a flow diagram depicting an exemplary embodiment of a method 200 for detecting long-term anomalous network activities as related to one or more aspects of the invention. The method 200 begins at step 202 and proceeds to step 204 where event logging information is received. In one embodiment, a plurality of parsers $104_{1 \ldots m}$ supported by at least one server receives log information that was collected by a plurality of network and security devices $102_{1 \ldots n}$.

At step 206, standardization and aggregation procedures are performed on the collected log information. In one embodiment, the parsers $104_{1 \ldots m}$ standardize the log information into a common form that can be comprehended by the ECs $106_{1 \ldots p}$. Similarly, the parsers 104 aggregate the log information in a manner that conserves network resources but does not compromise the accuracy of the system. For instance, if an event occurs 5 times, the event data (i.e., log information) is "wrapped" and linked to a tag that indicates the similar event was collected on 5 separate occasions (as opposed to sending the log information 5 separate times to the ECs). In one embodiment, time zone normalization (e.g., to convert all times to GMT) is performed in the parsers as well.

At step 207, the standardized log information is received. In one embodiment, the ECs $106_{1 \ldots p}$ receives the standardized (and aggregated) log information from the parsers $104_{1 \ldots m}$.

At step 208, the standardized log information is normalized. In one embodiment, each EC 106 normalizes the log information that it receives. For example, the same type of web traffic may be assigned three different "names" by three different firewall administrators in three different instances. Since the three instances of web traffic seen by the firewall are identical in type (despite the difference in the names), an EC 106 will normalize the data (e.g., assigning a common name to the three sets of data) in a manner that the data will be grouped together for proper processing. In one embodiment, the process may also entail the normalization of protocol ports by the ECs 106.

After the conclusion of step 208, the method 200 separates into two processes that are conducted simultaneously. In one path, the method 200 proceeds to step 210, where state-based event correlation is performed. In one embodiment, the ECs correlate and compare the event data (i.e., standardized and normalized log information) to a predefined rule set. Notably, the ECs $106_{1 \ldots p}$ are provisioned with a set of rules that enables an EC 106 to detect abnormal activity (e.g., log information matches a predefined rule that corresponds to anomalous activity) conducted over a brief or short time period (e.g., 15 minutes period) using a limited number of data attributes. In the event the received log information matches one of the rules in the set, an alarm is generated in near, real time.

At step 212, the generated alarms are sent to a global correlator 114. In one embodiment, the GC 114 receives alarm messages produced from short, near real-time alarming processes performed by each of the regional ECs $106_{1 \ldots p}$.

At step 214, global correlation is performed. In one embodiment, the global correlator 114 correlates all of the received alarms. For example, the global correlator 114 may determine if the alarm is actionable or non-actionable. Actionable alarms are sent up to the CMC as alarms that require a detailed investigation and may result in some mitigation actions. (e.g., remove a virus from a computer). Non-actionable alarms are not sent to the CMC as no "action" (such as mitigation) can be performed. These non-actionable alarms are sent to the database for detailed or longer term analysis that may depict a trend that should be monitored but do not have any direct or immediate remedy. The actionable and non-actionable alarms are pre-established in a reference table. Additionally, the global correlator 114 may perform "known scanner suppression" if it is determined that the alarm was caused by an acceptable scanning entity (e.g., a network operator conducting a scanning test). A "known scanner" table, which is a predefined list of IP addresses that have been approved to perform the scanning operations detected, may be utilized. If the IP responsible for the scanning alarm is an authorized scanner, the alarm is not forwarded to the CMC. The global correlator 114 also renames and remaps alarms from a standardized alarm category name (e.g., a taxonomy such as IDS.Detect.Exploit.Trojan) to a more English like description for this alarm (e.g., an IP Address may be infected with a "Trojan" using a predetermined translation table).

At step 216, the alarm data is provided to a central management console. In one embodiment, the global correlator 114 transmits the alarm data to the CMC 116. The CMC 116 may then provide the data to a network operator via a screen display. The method 200 then proceeds to step 226 and ends.

In the second path (branching from step 208), the method 200 continues to step 218 (from step 208) where log information is provided into the database 110. In one embodiment, the normalized and standardized log information (e.g., event data) is sent to a server 112 that is supporting a RDMS (e.g., AT&T DAYTONA system). The RDMS is configured to store event data for a predefined period (e.g., 120 days).

At step 220, a data mining application is applied. In one embodiment, a query language application (e.g., AT&T CYMBAL) is executed. For example, the application receives event data from the database 110 as input and performs a searching process on the data to locate predetermined characteristics that indicate suspicious activity. Specifically, the query language application is used to execute data mining programs $109_{1 \ldots q}$ that process normalized and standardized data (e.g., event data) that has been collected over an extended period of time. For example, the program takes in a broad description of different attributes (e.g., characteristics defined by long-term security event detection algorithms) that may be exhibited by the event data and produces an alarm message if one or more desired attribute (which may indicate suspicious network activity) is found to exist in the event data being processed. The data mining programs $1091 \ldots q$ may comprise any of the algorithms known by those skilled in the art and may include the following data mining programs.

One such data mining activity includes a "scancheck." The scancheck is used to detect scanning on a given port within a defined window. In instances where IP addresses are VPN assigned addresses, the user-id of the assigned IP address is retrieved and used for the analysis. All IP addresses are checked against a compiled list of legitimate scanners. There are three types of alarms generated: suspected virus/worm exploit, P2P activity, and suspicious actiivity on unusual port.

Another data mining activity includes a volumetric algorithm which comprises an automatic, robust statistical algorithm and procedure for anomaly detection to alert for large-scale attacks by using hourly volumetric counts in flows/packets/bytes. When there is an increase of traffic volume, the data mining actiivity determines if the increase can be attributed to normal traffic fluctuation or an anomaly that suggests an attack might be occurring. An alarm is generated in the event anomolous activity is detected. This data mining algorithm is applied to bytes and packets of Netflow data to the Maillennium email gateways and relay hosts and other UGN ports and protocols netflow data. Similarly, it is also applied to PE data.

A third data mining activity includes a volumetric algorithm for Internet firewall activity. This comprises a statistical analysis of firewall logged transactions (such as allow, deny and info) aggregated over six firewalls at 20-minute interval on a per-port basis. A unique characteristic of the firewall log data, in contrast to netflow data, is the lack of clear daily and weekly cycles. In addition, there is also random variation ("noise") in the data. Thus, the algorithm estimates baseline activity for a time series based on the historical data after filtering the noise and calculates thresholds. Alarms are generated for periods that exceed the threshold. Post alarm analysis tools are available for this alarm to determine if this is caused by internal activity versus external activity as well as which IP address' activity contributed to the alert.

A fourth type of data mining activity comprises a suspicious proxy activity which highlights unusual web proxy activity in instances where a URL contains an IP address as opposed to a name. Some applications make use of this technique for legitimate purposes. However, after filtering some of the usual applications, the rest are questionable and are most likely not legitimate. This includes sports, gaming, P2P, VOIP bittorrent, spyware and virus/botnet activity.

Similarly, a VPN denied access algorithm is a data mining program that highlights unusual access attempts to VPN systems. It primarily searches for an unusual number of denies for a given user during a specified window. It also looks for the same unusually high number of denies for an ISP SIP address (i.e., the address from where the user is attempting to connect to the network). Additionally, it highlights an unusual number of denies where logons from multiple ISP SIP addresses are attempting to logon with a specific user's credentials.

The Maillennium algorithm is a data mining program that monitors each of three Maillennium gateways. It produces an alarm when the number of connections refused (due to load) increases for five ten-minute intervals. A significant event occurs when this data mining program alarms on all three Maillennium Servers at the same time.

Another data mining program comprises service specific netflow analyis. This algorithm reviews the protocol and port activity targeting systems identified with a particular service (application). It searches for significant changes in the types of flows targeting the application. It also looks at a ratio of service to non-service flows and searches for volume changes of service and non-service flows.

At step 222, alarms are generated. In one embodiment, the query language application locates a suspicious activity in the event data provided by the database 110. Consequently, the query language application generates alarm messages in response to the detection of suspicious activity in the "mined" event data.

At step 224, the alarms are provided to the event correlators. In one embodiment, the alarm messages outputted from the query language application is transmitted to the event correlators. Once the alarm messages are flowed back to the ECs $106_1 \ldots _p$, the same correlation functionality that is available to short-term event data is re-applied to the alarm messages that have been mined out from the 120 days of data. Alternatively, the ECs $106_1 \ldots _p$ may be configured to allow the alarm messages to pass directly through to the global correlator 114 or the alarm messages may be processed in accordance with new programming rules (e.g., security event detection rules) provided by a network operator (e.g., a rule set up to watch a particular source IP address that is responsible for an excessive amount of scanning activity over a long period of time).

Figure 3:
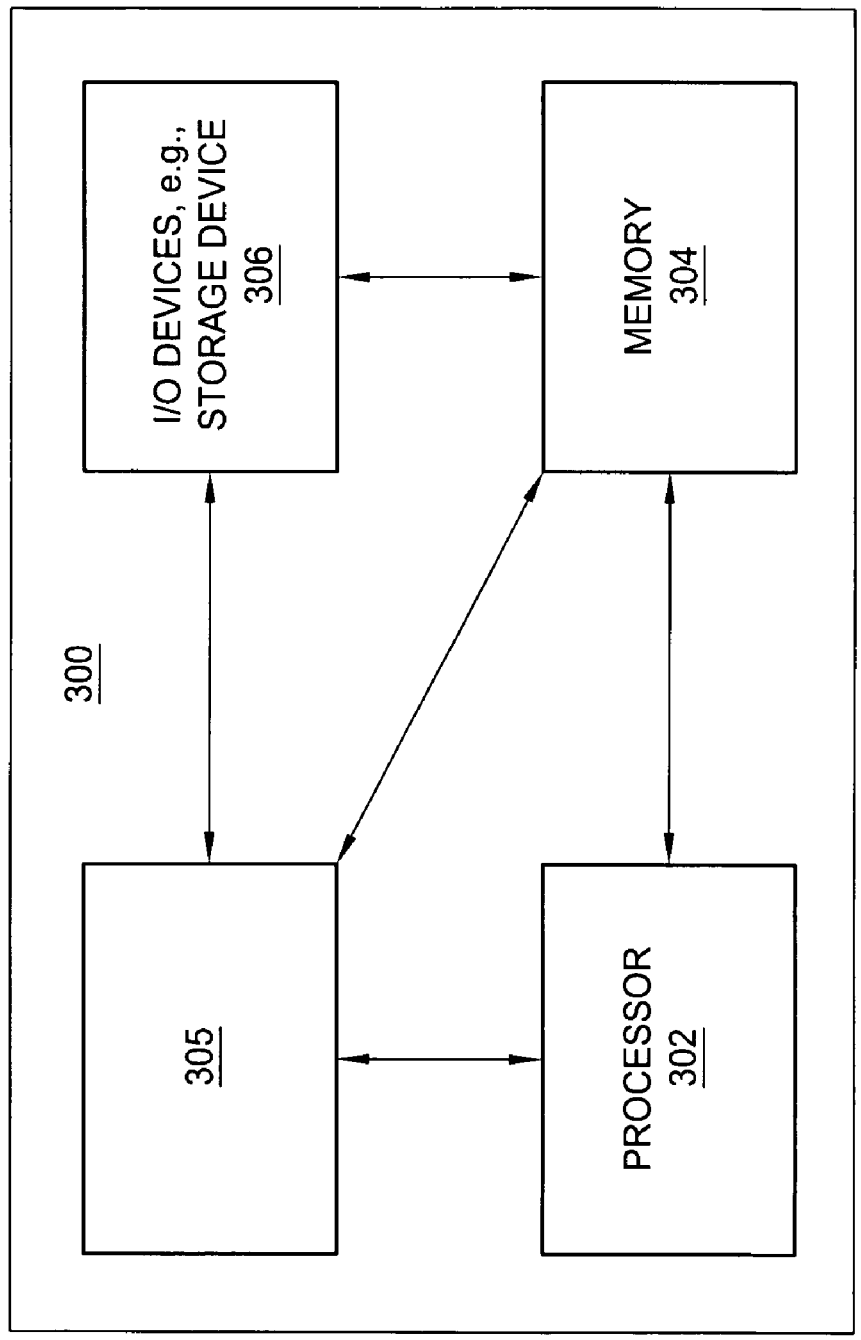
FIG. 3 is a block diagram depicting an exemplary embodiment of a computer suitable for implementing the processes and methods described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for detecting anomalous network activities, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 305 for detecting anomalous network activities can be loaded into memory 304 and executed by processor 302 to implement the functions as discussed above. As such, the present process 305 for detecting anomalous network activities (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for detecting an anomalous activity in a communications network, comprising:

receiving short-term event data from a plurality of servers, wherein the short-term event data is associated with log information;

executing a state based rules system to process the short-term event data over a predefined time period;

generating an alarm message in response to detecting the anomalous activity in accordance with a predefined long-term security data mining program; and providing the alarm message to one server of the plurality of servers, wherein the alarm message is routed directly to a global correlator upon receipt at the one server.

2. The method of claim 1, wherein the short-term event data comprises normalized and standardized data.

3. The method of claim 1, wherein the short-term event data is stored in a relational database management system.

4. The method of claim 1, wherein the alarm message is processed in accordance to an existing set of short-term security event detection rules.

5. The method of claim 1, wherein the plurality of servers comprises a plurality of event consolidators.

6. The method of claim 1, wherein the predefined long-term security data mining program is executed by a query language application.

7. The method of claim 1, further comprising:
storing the short-term event data for a predefined duration.

8. A non-transitory computer readable medium having stored thereon a plurality of instructions, the plurality of instructions including instructions which, when executed by a processor, causes the processor to perform a method for detecting an anomalous activity in a communications network, comprising:

receiving short-term event data from a plurality of servers, wherein the short-term event data is associated with log information;

executing a state based rules system to process the short-term event data over a predefined time period;

generating an alarm message in response to detecting the anomalous activity in accordance with a predefined long-term security data mining program; and providing the alarm message to one server of the plurality of servers, wherein the alarm message is routed directly to a global correlator upon receipt at the one server.

9. The non-transitory computer readable medium of claim 8, wherein the short-term event data comprises normalized and standardized data.

10. The non-transitory computer readable medium of claim 8, wherein the short-term short-term event data is stored in a relational database management system.

11. The non-transitory computer readable medium of claim 8, wherein the alarm message is processed in accordance to an existing set of short-term security event detection rules.

12. The non-transitory computer readable medium of claim 8, wherein the plurality of servers comprises a plurality of event consolidators.

13. The non-transitory computer readable medium of claim 8, wherein the predefined long-term security data mining program is executed by a query language application.

14. The non-transitory computer readable medium of claim 8, further comprising:
storing the short-term event data for a predefined duration.

15. An apparatus comprising a processor for detecting an anomalous activity in a communications network the processor configured to:

receive short-term event data from a plurality of servers, wherein the short-term event data is associated with log information;

execute an event detection rule to process the short-term event data over a predefined time period;

generate an alarm message in response to detecting the anomalous activity in accordance with a predefined long-term security data mining program; and provide the alarm message to one server of the plurality of servers, wherein the alarm message is routed directly to a global correlator upon receipt at the one server.

16. The apparatus of claim 15, wherein the short-term event data is stored in a relational database management system.

17. The apparatus of claim 15, wherein the predefined long-term security data mining program is executed by a query language application.

18. The apparatus of claim 15, wherein the processor is further configured to:
store the short-term event data for a predefined duration.

* * * * *